(12) United States Patent
Duret

(10) Patent No.: US 6,667,612 B2
(45) Date of Patent: Dec. 23, 2003

(54) SHORT-DISTANCE LOCATING SYSTEM

(75) Inventor: Denis Duret, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/049,778

(22) PCT Filed: Jul. 27, 2001

(86) PCT No.: PCT/FR01/02476

§ 371 (c)(1),
(2), (4) Date: Feb. 19, 2002

(87) PCT Pub. No.: WO02/10674

PCT Pub. Date: Feb. 7, 2002

(65) Prior Publication Data

US 2002/0140419 A1 Oct. 3, 2002

(51) Int. Cl.[7] .................. G01B 7/00; G01B 7/14; H04B 5/00; G01D 5/20

(52) U.S. Cl. .............. 324/207.17; 340/572.5; 340/551

(58) Field of Search .............. 324/207.12, 207.16, 324/207.17, 207.19, 207.26, 225; 340/505, 551, 572.1, 572.2, 572.5

(56) References Cited

U.S. PATENT DOCUMENTS

| | | | | |
|---|---|---|---|---|
| 3,852,662 A | | 12/1974 | Katz ........................ 324/234 |
| 3,997,835 A | * | 12/1976 | Ando et al. ............. 324/207.26 |
| 4,608,564 A | * | 8/1986 | Hoffman ................ 340/870.02 |
| 4,611,169 A | * | 9/1986 | Hermann ................ 324/207.17 |
| 4,642,786 A | * | 2/1987 | Hansen ........................ 702/153 |
| 5,115,224 A | * | 5/1992 | Kostusiak et al. .......... 340/574 |
| 5,414,410 A | * | 5/1995 | Davies et al. .............. 340/551 |
| 5,721,487 A | | 2/1998 | Milosevic ............. 324/207.26 |
| 5,986,549 A | * | 11/1999 | Teodorescu ................ 340/561 |

FOREIGN PATENT DOCUMENTS

| | | |
|---|---|---|
| EP | 0215695 | 3/1987 |
| GB | 2257528 | 1/1993 |

\* cited by examiner

*Primary Examiner*—N. Le
*Assistant Examiner*—Reena Aurora
(74) *Attorney, Agent, or Firm*—Thelen Reid & Priest LLP; Robert E. Krebs

(57) ABSTRACT

A short distance positioning system for a mobile object with respect to a fixed reference system. The mobile object is equipped with a probe, and at least one resonant circuit enabling reception of a magnetic field. A detection and comparison circuit detects the amplitude of the voltage induced at the terminals of the resonant circuit, thereby deducing the displacement of the probe with respect to the reference system.

14 Claims, 3 Drawing Sheets

SHORT-DISTANCE LOCATING SYSTEM

This application is a national phase of PCT/FR01/02476 which was filed on Jul. 27, 2001, and was not published in English.

DOMAIN OF THE INVENTION

The invention relates to an electromagnetic positioning system for an object free to move with respect to a fixed reference system in which the displacement of the object is of the order of a few centimeters, with a precision better than 1 millimeter.

The invention is used for applications in many domains, and particularly in the structural mechanics domain to study deformations of solids subject to stresses, or for protection to monitor the position of an object that could be stolen or in the virtual reality domain to position elements with a man-machine interface.

STATE OF THE ART

At the present time, there are many systems for positioning a mobile object with respect to a fixed reference system. These include some systems that are dedicated solely to short distance positioning, in other words displacement of the object that moves only a short distance with respect to the reference system, in other words of the order of a few centimeters to a few meters.

One of these short distance positioning systems is a visual technique that consists of fixing a recognizable target on the mobile object and aiming at this target with several cameras. Images from the cameras are then processed to determine the position of the target and consequently the position of the object. However, these systems are limited by the fact that the target has to be seen by the cameras, in other words it must be within the field of vision of these cameras. Therefore, no obstacles can be accepted. Furthermore, this system has a large external infrastructure, in other words it is large; therefore, it is difficult to use it for positioning within a few centimeters.

A variant of this visual technique consists of using telemeters, for example laser telemeters that aim at the target. This technique is used to position an object moving over distances of a few centimeters; but it always has the disadvantage that the target must be visible from the telemeter.

A mechanical technique can also be used to position an object at short distance, this technique consisting of fixing the object to a set of mechanical links. In this case, the link between the object to be positioned and the reference system is mechanical, which has disadvantages in the sense that not all displacements may be authorized, and detection of displacement is not very precise.

Another technique for short distance positioning consists of using magnetic dipoles associated with magnetometers. Patent application EP-0-215 695 describes a system of this type. Positioning of magnetic dipoles by magnetometers is adapted to positioning of objects moving over distances varying from a few centimeters up to a few meters; the system needs to be miniaturized to detect displacements of a few centimeters, in other words for very short distance positioning. However, it is difficult to miniaturize magnetometric sensors for which the precision must be high.

Furthermore, positioning an object in three dimensions makes use of complex calculation algorithms; therefore it is difficult to envisage the use of this type of system to position an object moving within a few centimeters in three dimensions.

PRESENTATION OF THE INVENTION

The purpose of the invention is to overcome the disadvantages of the techniques described above. Consequently, it proposes an electromagnetic system for positioning a mobile object with respect to a fixed reference system, in which the displacement of the object is of the order of a few centimeters and the precision is better than 1 millimeter.

More precisely, the invention relates to a system for positioning a mobile object with respect to a fixed reference system, characterized by the fact that:

the mobile object is equipped with a probe (1) comprising at least one resonant circuit enabling reception of a magnetic field with frequency $f_g$ and transmission of a magnetic field at frequency $f_e$; and, the reference system (2) is provided with:

means of transmission/reception of a magnetic field comprising a voltage generator (G) generating a signal with frequency $f_g$ powering at least one electromagnetic coil (L3; L5) and at least one capacitor (C3; C5) forming a series resonant circuit, with the said coil;

anti-dazzle means by which the transmission/reception means can distinguish the magnetic field with frequency $f_e$ from the magnetic field with frequency $f_g$; and detection and comparison (4) means to detect the amplitude of the voltage induced at the terminals of the resonant transmission/reception circuit and to deduce the displacement of the probe with respect to the reference system.

In a first embodiment, the transmission frequency $f_e$ of the magnetic field and the reception frequency $f_g$ of the magnetic field are equal, the probe comprising a single parallel resonant LC circuit. In this case, the magnetic field transmission/reception means may include resistances connected to the resonant transmission/reception circuits and to the detection and comparison means, using a bridge set up.

In another embodiment, the probe comprises a first parallel LC resonant circuit for reception of the magnetic field with frequency $f_g$ and a second series LC resonant circuit for transmission of the magnetic field with frequency $f_e$, where $f_g \neq f_e$.

According to another embodiment of the invention, the positioning system is characterized in that the transmission/reception means comprise:

a resonant transmission circuit for the magnetic field at frequency $f_g$; and at least one reception circuit for the magnetic field at frequency $f_e$ comprising a secondary coil connected to a capacitor to form a secondary resonant circuit.

Advantageously, the axes of the secondary coils are parallel to each other and parallel to the axis of the probe coil.

The detection and comparison means may comprise:

a differential amplifier connected to the terminals of each resonant reception circuit;

synchronization means for synchronizing signals output from each differential amplifier; and processing means to deduce the position of the probe starting from signals originating from secondary resonant circuits.

According to a first variant, the anti-dazzle means are electromagnetic coils placed close to each secondary coil and powered by the generator.

According to a second variant, the anti-dazzle means are differential amplifiers into which the signal output from the detection and comparison means is applied to one input and an adjustable voltage is applied to another input.

DETAILED DESCRIPTION OF EMBODIMENTS OF THE INVENTION

This invention relates to an electromagnetic positioning system capable of positioning a mobile element that may or may not be visible, with respect to a fixed reference system, for a displacement of the order of 1 centimeter.

In the system according to the invention, the mobile object to be positioned is equipped with a probe made using at least one LC resonant circuit, for the reception of a magnetic field at a frequency $f_g$ and the transmission of a magnetic field at a frequency $f_e$ between about 100 kHz and 1 MHz.

According to a first embodiment of the probe, the frequencies $f_g$ and $f_e$ are equal. In this mode, the probe comprises a single resonant circuit formed from a coil L1 and a capacitor C1 connected in parallel. In this case, the voltage induced by the received magnetic field enables circulation of a current in the resonant circuit that passes through the induction coil L1 and generates a magnetic field.

Figure 1:
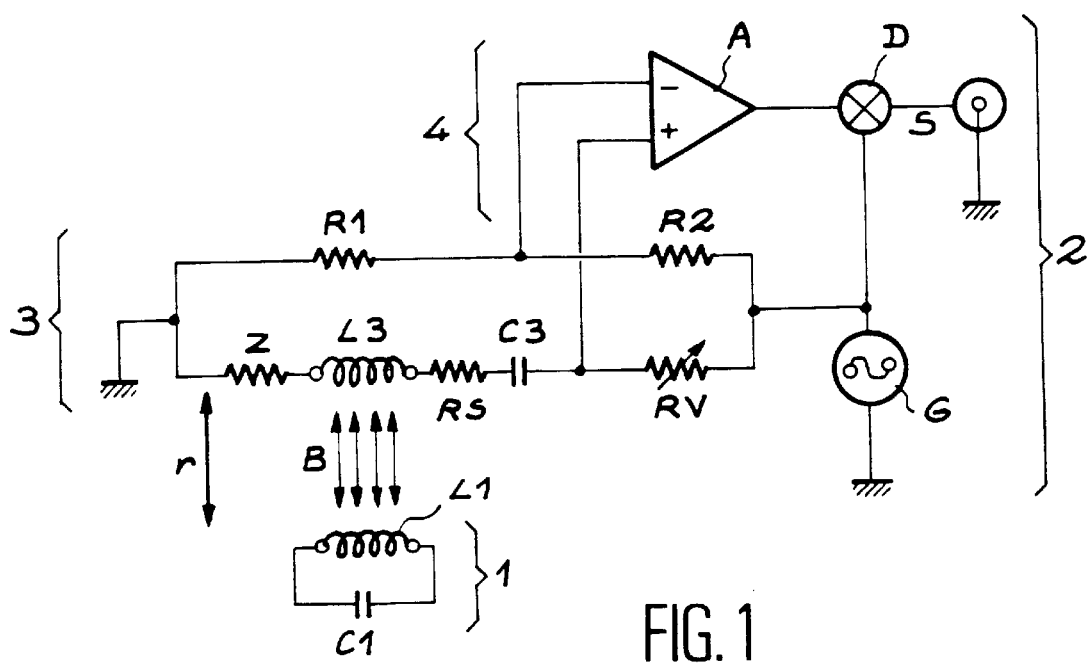
FIG. 1 diagrammatically shows the first embodiment of the electromagnetic circuit of the system according to the invention.

This first embodiment of the probe is illustrated in FIG. 1 which will be described in detail later.

Figure 3:
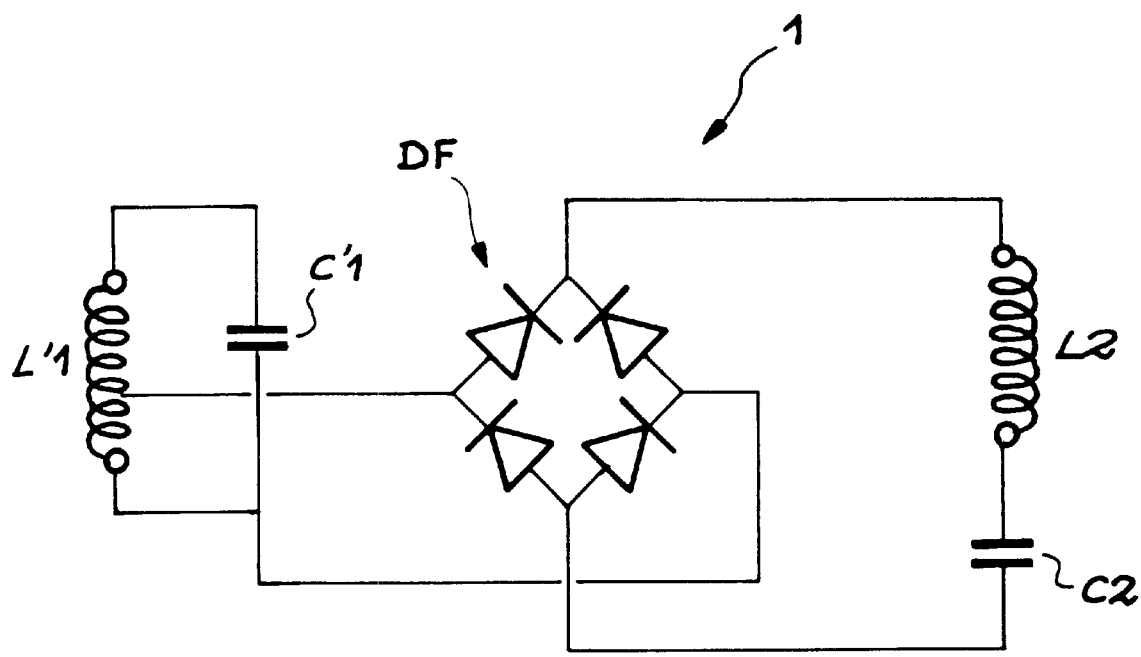
FIG. 3 shows the second embodiment of the probe used in the system according to the invention.

In a second embodiment shown in FIG. 3, the probe comprises two LC resonant circuits. One of these resonant circuits comprises a coil L1' and a capacitor C1' connected in parallel; this circuit receives the magnetic field at frequency $f_g$. The other circuit comprises a coil L2 and a capacitor C2 connected in series; this circuit transmits a magnetic field with frequency $f_e \neq f_g$. In the example shown in FIG. 3, the reception circuit L1'C1' and the transmission circuit L2C2 are connected to each other through a frequency doubler DF, for example made by a diode bridge. In this case $f_e = 2 \times f_g$.

In order to simplify the description, the remainder of the system according to the invention will be described for a probe conform with the first embodiment, in other words with a single LC circuit.

In the system according to the invention, the fixed reference system is equipped with means of transmission of a magnetic field. These transmission means consist of an LC resonant circuit and a voltage generator generating a signal at frequency $f_g$. The LC resonant circuit in these transmission means comprises an electromagnetic coil that generates a magnetic field B at frequency $f_g$. This circuit is resonant at a frequency $f_g$, in other words the same frequency as the generator.

FIG. 1 diagrammatically shows a first embodiment of the system according to the invention.

In this embodiment, the probe of the mobile object reference 1 is a probe with a single resonant circuit.

The fixed reference system is reference 2; it is equipped with an electromagnetic circuit that comprises firstly means 3 of transmission/reception of a magnetic field, and secondly means of detecting and comparing the two signals sampled at the terminals of the transmission/reception means.

In this embodiment, the same circuit controls the transmission of a magnetic field $f_g$ and reception of the magnetic field $f_e$ (where $f_g = f_e$)

The transmission/reception means 3 comprise a generator G transmitting a signal at frequency $f_g$ and a resonant circuit composed of a coil L3 and a capacitor C3 connected in series.

The function of this coil L3 is firstly to transmit a magnetic field at the same frequency $f_e$ as the resonant frequency of the probe, and to be sensitive to the position of the probe.

The transmission/reception means 3 also comprise two resistances R1 and R2 in series installed with the resonant circuit L3C3 and the variable resistance $R_v$ to form a bridge. Detection and comparison means 4 are connected between the two legs of the transmission/reception means, in other words firstly between resistances R1 and R2, and secondly at the output from the L3C3 circuit to compare the voltages of the signals circulating in these two legs.

These detection and comparison means may consist of a differential amplifier reference A, for which the + and − input terminals are connected to the bridge assembly legs. The output of the amplifier A is connected to synchronous detection means D, themselves connected to generator G. Thus, the voltage at the terminals of the differential amplifier A is detected by synchronous detection with generator G.

In this embodiment of the invention, the anti-dazzle means are made by the measurement bridge (circuit L3C3+ resistances R1, R2, $R_v$) The function of these anti-dazzle means at the time of reception of the magnetic field with frequency $f_e$, is to enable better recognition of the said magnetic field by the transmission/reception means. In other words, amplifier A is not dazzled by the transmission field with frequency $f_g$. Furthermore, these anti-dazzle means enable the detection means to not detect the signal originating from the transmission through the fixed reference system.

In FIG. 1, the magnetic field transmitted by coil L3 and received by the resonant circuit of probe 1 is marked as reference B. The coil L3 is associated with a capacitor C3 such that the resonant frequency of circuit L3C3 is equal to the generator frequency $f_g$. At resonance, the impedance of this circuit L3C3 is limited to the value of the loss resistance Rs of the coil. This entire circuit forms part of a bridge set up. The impedance denoted Z placed in series with the coil L3 represents a term due to coupling between L3 and L1, matched at the same frequency as the generator. This impedance Z depends only on the properties of resonant circuits L3C3 and L1C1, and their geometric position with respect to each other.

When the probe is at a very large distance compared with the coil dimensions, the impedance Z is zero. The condition for balancing the bridge is then written RsR2=R1Rv, where Rv is a variable resistance used to balance the bridge. When the probe is brought towards the reference system 2, a non-zero impedance value Z appears which induces a voltage difference at the terminals of the comparison means 4.

Thus, it can be understood that the system can be used to estimate variations of the distance between the probe 1 and the fixed reference system 2 in which the coil L3 is located.

In practice, it is useful to adjust the equilibrium of the bridge at a rest distance r and therefore only observe non-zero voltage for variations of the distance between the probe and the reference system. In other words, if variations in the distance d between the probe and the reference system are small compared with the rest distance r, the detected voltage can be obtained analytically by relations known to an expert in the subject, such as those described in F. TERMAN, Radio Engineer's handbook, McGraw Hill Inc., New York and London, 1943, pp. 67–73 and 148–164.

Another method of adjusting the system is simply to calibrate it.

Note that if this system is sensitive to variations in the distance d, it is also sensitive to variations in the orientation of the axes of the coils with respect to each other. Thus, it is preferable that the axes of coils L3 and L1 are parallel, in other words that they have the same direction and sign.

Figure 2A:
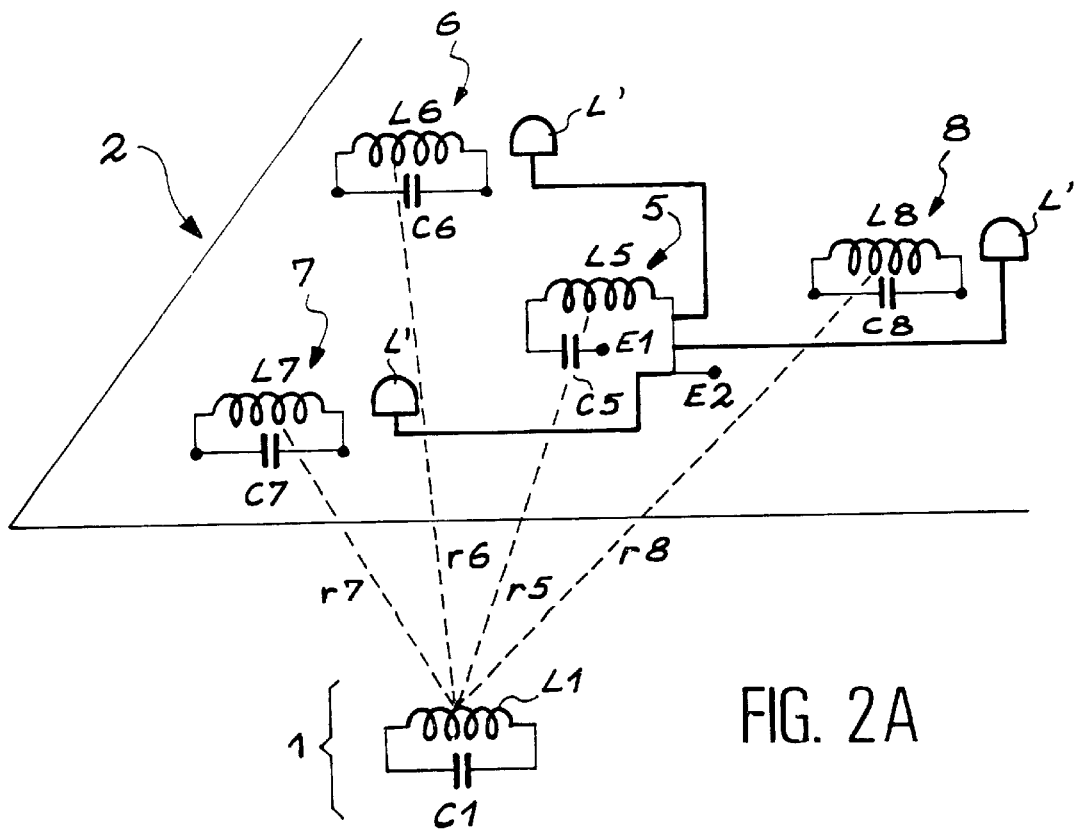
FIGS. 2A and 2B diagrammatically show the second embodiment of the electromagnetic circuit of the system according to the invention.
Figure 2B:
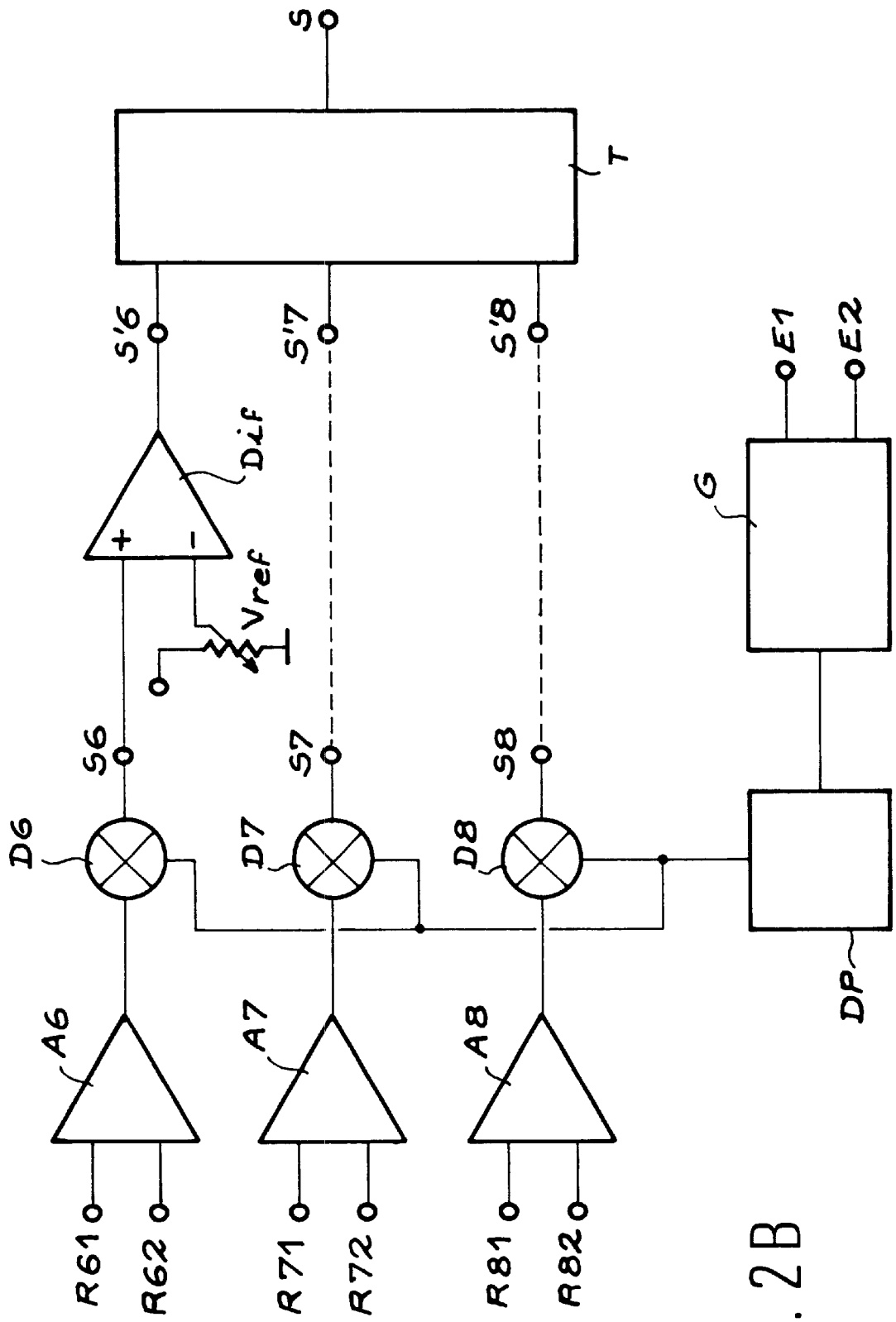

FIGS. 2A and 2B show another embodiment of the system according to the invention.

In this embodiment, the bridge set up of the electromagnetic circuit of reference system 2 is replaced by a signal compensation circuit made using counter coils.

In this embodiment, the probe of the mobile object is chosen to be identical to the probe for the first embodiment. Therefore, its references are identical to those in FIG. 1.

As shown in FIG. 2A, the reference system 2 in this embodiment comprises a resonant transmission circuit reference 5, and several resonant reception circuits references 6, 7 and 8. The resonant reception circuits each comprise a reception coil L6, L7 or L8 connected in parallel with a capacitor C6, C7 or C8 respectively.

As in the first embodiment, the function of the transmission coil L5 of the transmission means 5 is to generate a magnetic field B at frequency $f_g$.

Therefore, the probe is subjected to a magnetic field that induces a current in its LC circuit. The probe then behaves like a secondary transmission circuit and in turn generates a magnetic field that is input to reception circuits 6, 7 and 8.

The fact that several reception circuits are used is a means of increasing the number of degrees of freedom in the displacement of the object. Thus, the invention proposes to use three reception circuits in order to detect a displacement in three dimensions.

As already explained, the axis of coil L5 is preferably parallel to the axis of coil L1 of the probe.

Similarly, the axes of the secondary coils are preferably parallel to the axis of coil L1 of the probe.

As shown in FIGS. 2A and 2B, each resonant circuit 5, 6, 7 and 8 is connected to an electronic circuit for processing this information. More precisely, the electromagnetic circuit for reference system 2 comprises pins E1 and E2 making the connection between the generator G and the resonant circuit L5C5. For example, the generator could be a frequency oscillator $f_g$.

In order to compensate for the reactance of coil L5 at the generator frequency $f_g$, a capacitor C5 is connected in series with this coil L5 such that $4\pi^2 L5C5 = 1$. The generator G will then only see the real impedance of the losses of coil L5. The magnetic field B created at the rest distance r5 between coil L5 and probe 1 is then written in the following form:

$$B_0 = \frac{\mu_0 M}{4\pi r5^3},$$

where $\mu_0$ is the permittivity of a vacuum and M is the dipole moment of the transmission coil L5, where M=niS, n is the number of turns in the transmission coil, S is its cross-section and i is the current that passes through it at frequency $f_g$.

The current induced in the probe is then:

$$i_0 = \frac{2\pi f_g}{Rs} B_0,$$

where Rs is the series resistance of the coil L5 (Rs is not shown in this figure in order to simplify the figure).

At the rest distance r6 between the reception circuit 6 and the probe 1, the secondary magnetic field B created by probe 1 is in the following form:

$$B_6 = \frac{\mu_0 M}{4\pi r6^3}$$

The same is true for secondary magnetic fields $B_7$ and $B_8$ with respect to distances r7 and r8.

Each of these magnetic fields $B_6$, $B_7$ or $B_8$ creates a voltage induced in the corresponding coil L6, L7 or L8 with amplitudes $2\pi f_g B_6$, $2\pi f_g B_7$, $2\pi f_g B_8$, respectively. This voltage is multiplied by the overvoltage coefficient of the corresponding resonant circuit L6C6, L7C7 or L8C8, provided that the said circuit is matched at frequency $f_g$.

As shown in FIG. 2B, the reception means 6 are connected to an amplifier A6 by means of pins R61 and R62 placed at each end of the coil L6. The amplitude of the signal output from the reception means and amplified by A6 is detected by comparison with the signal generated by the generator G and shifted appropriately by the phase shifter DP. For example, this comparison may be made by a synchronous detector D6 controlled by the oscillator G and the phase shifter DP. This synchronous detection is used to filter the signal originating from the reception means on a narrow band and therefore to limit the sensitivity of the system to parasites.

However, note that these detection means are only necessary when the transmission frequency $f_g$ and the reception frequency $f_r$ are equal. If not (for example if the probe in FIG. 3 is used), these detection means are not useful. In this case, it is sufficient to filter the signal output from the amplifier around frequency $f_e$.

The electronic processing means of the signals originating from the reception means 7 and 8 are identical to the electronic processing means that have just been described for signals output from reception means 6.

The system according to the invention comprises anti-dazzle means that prevent the secondary coils L6, L7 and L8 from being "blinded" by the magnetic field originating from the coil L5, in other words such that coils L6, L7 and L8 react only to the magnetic field with frequency $f_e$ retransmitted by probe 1.

For example, these anti-dazzle means may consist of additional coils that are smaller than coils L6, L7 and L8; in this case, the current input to the transmission coil L5 also powers these additional coils placed close to each of the secondary coils L6, L7 and L8, and the function of which is to create a field at the secondary coils equal to and in the opposite direction from the field transmitted by the transmission coil L5. Thus, when there are no mobile objects close to the reference system, the field induced in the secondary coils is zero.

These anti-dazzle means can also be made electronically by means of differential amplifiers. In this case, a differential amplifier Dif is connected to the output of each detection device D6, D7 and D8; more precisely, the signal S6, S7 or S8 output from the synchronous detectors D6, D7 or D8 is input to the + terminal of each amplifier Dif, and the variable voltage $V_{ref}$ is input to the − terminal. This voltage $V_{ref}$ is adjusted such that it cancels the signals S6, S7 or S8 when there is no probe.

One variant consists of combining the two anti-dazzle means described above; in this case, the electronic anti-dazzle means can be used to recover anti-dazzle defects, for example due to geometric imperfections.

Outputs S6, S7 and S8 from the synchronous detectors [or outputs S'6, S'7 or S'8 if differential amplifiers Dif are used], are connected to processing means T that use these signals to determine the exact position of the probe with respect to the reference system. Variations in the position of probe 1 with respect to the reference system 2 induce voltage variations at the outputs from the three detection systems S6, S7 and S8. It is possible to correlate these variations with rest distances r6, r7 and r8 using the equations given previously, and thus to determine the position of the probe, provided that the corresponding positions of the transmission means and the three reception means 6, 7 and 8 are known, taking account of the fact that two distances r5 and r6 (or r7 and r8, or . . . ) form a triangle.

These processing means T are conventional calculation means derived from field equations or obtained by learning.

The invention was described above in a configuration in which there is one transmission means 5 and three reception means 6, 7 and 8, and in which the axis of the probe is parallel to the axes of the other coils. However, it is possible that the axis of the probe is not parallel to the axes of the other coils, and in this case an additional variable is used to increase the number of equations to correspond to the number of unknowns, this variable being related to the use of additional reception means with a perpendicular axis.

Advantageously, the electronic circuit in FIG. 2B may be miniaturized in the form of a specific integrated circuit; this circuit may be integrated into the support containing the coils of transmission and reception circuits in FIG. 2A. In other words, for example, the system according to the invention may be made on a printed circuit with coils printed in the form of a spiral. The electronic circuit in FIG. 2B is then implemented on the same circuit, either in the form of surface mounted integrated components, or in the form of a specific circuit. Similarly, the probe may be made on a printed circuit.

The system according to the invention may also be made using microcoils in order to make the system very compact, in other words with dimensions of the same order of magnitude as the positioning distance, namely of the order of 1 centimeter or less. Similarly, the dimensions of the probe may be extremely small, for example of the order of 1 millimeter.

What is claimed is:

1. Positioning system for a mobile object with respect to a fixed reference system, characterized by the fact that:

the mobile object is equipped with a probe (1) comprising at least one resonant circuit (L1C1) enabling reception of a magnetic field with frequency $f_g$ and transmission of a magnetic field at frequency $f_e$; and, the reference system (2) is provided with:

means of transmission/reception (3; 5) of a magnetic field comprising a voltage generator (G) generating a signal with frequency $f_g$ powering at least one electromagnetic coil (L3; L5) and at least one capacitor (C3; C5) forming a series resonant circuit, with the said coil;

anti-dazzle means by which the transmission/reception means can distinguish the magnetic field with frequency $f_e$ from the magnetic field with frequency $f_g$; and detection and comparison (4) means to detect the amplitude of the voltage induced at the terminals of the resonant transmission/reception means and to deduce the displacement of the probe with respect to the reference system.

2. Positioning system according to claim 1, characterized in that the transmission frequency $f_e$ of the magnetic field and the reception frequency $f_g$ of the magnetic field are equal, the probe comprising a single parallel resonant LC circuit.

3. Positioning system according to claim 2, characterized in that the magnetic field transmission/reception means include resistances (R1, R2, Rv) connected to the resonant transmission/reception circuit and to the comparison means, using a bridge set up.

4. Positioning system according to claim 1, characterized in that the probe comprises a first parallel LC resonant circuit for reception of the magnetic field with frequency $f_g$ and a second LC resonant circuit in series for transmission of the magnetic field with frequency $f_e$, where $f_g \neq f_e$.

5. Positioning system according to claim 4, characterized in that the transmission/reception means comprise:

a resonant transmission circuit (5) for the magnetic field at frequency $f_g$; and at least one reception circuit (6, 7, 8) for the magnetic field at frequency $f_e$ comprising a secondary coil (L6, L7, L8) connected to a capacitor (C6, C7, C8) to form a secondary resonant circuit.

6. Positioning system according to claim 1, characterized in that the transmission/reception means comprise:

a resonant transmission circuit (5) for the magnetic field at frequency $f_g$; and at least one reception circuit (6, 7, 8) for the magnetic field at frequency $f_e$ comprising a secondary coil (L6, L7, L8) connected to a capacitor (C6, C7, C8) to form a secondary resonant circuit.

7. System according to claim 6, characterized in that the anti-dazzle means are electromagnetic coils (L') placed close to each secondary coil and powered by the generator.

8. System according to claim 6, characterized in that the anti-dazzle means are differential amplifiers into which the signal output from the detection and comparison means is input and an adjustable voltage is applied to another input.

9. Positioning system according to claim 6, characterized in that the axes of the coils are parallel to each other.

10. Positioning system according to claim 1, characterized in that the axes of the coils are parallel to each other.

11. Positioning system according to claim 10, characterized in that the detection and comparison means (4) comprise:

a differential amplifier (A; A6, A7, A8) connected to the terminals of each resonant reception circuit;

synchronization means (D; D6, D7, D8) to synchronize signals output from each differential amplifier with the generator signal; and processing means (T) to deduce the position of the probe from signals originating from secondary resonant circuits.

12. Positioning system according to claim 1, characterized in that the detection and comparison means (4) comprise:

a differential amplifier (A; A6, A7, A8) connected to the terminals of each resonant reception circuit;

synchronization means (D; D6, D7, D8) to synchronize signals output from each differential amplifier with the generator signal; and processing means (T) to deduce the position of the probe from signals originating from secondary resonant circuits.

13. System according to claim 12, characterized in that the anti-dazzle means are electromagnetic coils (L') placed close to each secondary coil and powered by the generator.

14. System according to claim 12, characterized in that the anti-dazzle means are differential amplifiers into which the signal output from the detection and comparison means is input and an adjustable voltage is applied to another input.

* * * * *